(12) United States Patent
Williams

(10) Patent No.: US 7,871,318 B2
(45) Date of Patent: Jan. 18, 2011

(54) AUTOMOTIVE AIR DUCT OSCILLATING DEVICE

(75) Inventor: Paxton S. Williams, Milan, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 1030 days.

(21) Appl. No.: 11/567,277

(22) Filed: Dec. 6, 2006

(65) Prior Publication Data
US 2008/0139103 A1  Jun. 12, 2008

(51) Int. Cl.
*B60H 1/26* (2006.01)
(52) U.S. Cl. .................... 454/155; 454/69; 454/152
(58) Field of Classification Search .......... 454/152, 454/153, 154, 155, 110, 157, 291, 337, 328, 454/223; 422/124
See application file for complete search history.

(56) References Cited

U.S. PATENT DOCUMENTS

| | | | |
|---|---|---|---|
| 1,743,994 A | | 1/1930 | Waterbury |
| 4,840,773 A * | | 6/1989 | Wade ......................... 422/124 |
| 4,981,324 A * | | 1/1991 | Law ........................ 297/180.11 |
| 5,823,869 A * | | 10/1998 | Paturzo ....................... 454/152 |
| 5,833,530 A * | | 11/1998 | Kuo ............................ 454/285 |
| 5,932,147 A * | | 8/1999 | Chen ........................... 261/30 |
| 6,079,781 A * | | 6/2000 | Tilley ....................... 297/250.1 |
| 6,102,660 A * | | 8/2000 | Lee .......................... 416/146 R |
| 6,103,201 A | | 8/2000 | Green |
| 6,116,851 A * | | 9/2000 | Oklejas, Jr. ................. 415/57.3 |
| 6,131,645 A * | | 10/2000 | Barr ............................. 165/41 |
| 6,342,003 B1 * | | 1/2002 | Wang .......................... 454/155 |
| 6,764,656 B1 | | 7/2004 | Matulevich |
| 6,772,538 B2 | | 8/2004 | Vagedes |
| 6,843,717 B1 * | | 1/2005 | Bennett ....................... 454/152 |
| 6,843,965 B2 | | 1/2005 | Matulevich |
| 6,884,159 B1 * | | 4/2005 | Ferraud, Jr. ................. 454/119 |
| 6,902,473 B1 * | | 6/2005 | Goobeck ..................... 454/127 |
| 7,070,172 B2 * | | 7/2006 | Fabrega et al. ................. 261/30 |
| 7,437,883 B1 * | | 10/2008 | Baldal ........................ 62/259.3 |
| 2003/0133859 A1 * | | 7/2003 | Chen et al. ................... 422/305 |
| 2007/0287374 A1 * | | 12/2007 | Day et al. .................... 454/158 |

FOREIGN PATENT DOCUMENTS

EP        0174582        3/1986

* cited by examiner

*Primary Examiner*—Steven B McAllister
*Assistant Examiner*—Brittany Towns
(74) *Attorney, Agent, or Firm*—Gifford, Krass, Sprinkle, Anderson & Citkowski, P.C.

(57) ABSTRACT

An oscillator device is configured to be attached to a vent in an interior of an automotive vehicle. The device includes a housing and a fan element pivotally coupled thereto. The fan element has a plurality of radially outwardly extending channels for causing rotation of the fan element relative to the housing and for distributing air radially outwardly from the vent as air passes from the vent and through the housing.

20 Claims, 4 Drawing Sheets

AUTOMOTIVE AIR DUCT OSCILLATING DEVICE

BACKGROUND OF THE INVENTION

1. Field of the Invention

The invention relates to air vent for automotive vehicle interiors. More particularly, the invention relates to an air vent having a fan element

2. Description of the Related Art

Automotive vehicles typically include a ventilation system that blows air through a vent for heating or cooling air in a passenger compartment. Conventional vent designs allow for only manual adjustment of the direction of the air flowing from the vent. Directing heated or cooled air, however, to any one location in the vehicle creates a hot or cold spot that may cause discomfort to occupants in the vehicle. This becomes an inconvenience for the occupants or the driver, who must continuously adjust the vent to minimize hot or cold spots felt by occupants in the vehicle. Thus, it remains desirable to provide a device for automatically distributing air in an oscillating manner to minimize hot or cold spots and to eliminate the need to continuously manually regulate the position of the vents.

SUMMARY OF THE INVENTION

According to one aspect of the invention, an oscillating device is provided for directing air exiting a vent in an interior of a vehicle. The oscillating device includes a housing, a fan element, a clip mechanism and a pair of buttons. The housing has opposite and spaced apart sides. Each of fie sides has an aperture extending therethrough. Each of the sides extends between opposite front and back ends of the housing. The fan element is disposed in the housing for rotation therein about a fixed fan pivot axis. The fan element has a plurality of channels extending generally radially outwardly relative to the pivot axis so as to distribute air in a radially outward direction as air passes between the front and back ends of the housing. The clip mechanism extends along the back side of the housing for fixedly securing the housing to the vent. The clip mechanism is actuatable by a pair of arms. The pair of buttons is each slidably coupled to respective apertures in the sides of the housing. Each button is in mechanical communication with one of the arms, so as to allow actuation of the clip mechanism as the buttons are displaced inwardly toward the housing.

According to another aspect of the invention, an oscillating device is provided for directing air exiting a vent in an interior of a vehicle. The oscillating device includes a housing and a fan element. The housing is configured for attachment to the vent. The housing has opposite and spaced apart sides. Each of the sides has an aperture extending therethrough. Each of the sides extends between opposite front and back ends of the housing. The fan element is pivotally coupled to the housing for rotation about a fan pivot axis. The fan element has a plurality of channels each having an axis that extends radially outwardly relative to the pivot axis so as to distribute air in a radially outward direction as air passes between the front and back ends of the housing. The angle between the fan pivot axis and the axis of each channel is directly proportional to the distance between the channel and the fan pivot axis.

BRIEF DESCRIPTION OF THE DRAWINGS

Advantages of the present invention will be readily appreciated as the same becomes better understood by reference to the following detailed description when considered in connection with the accompanying drawing, wherein.

DESCRIPTION OF THE INVENTION

Figure 1:
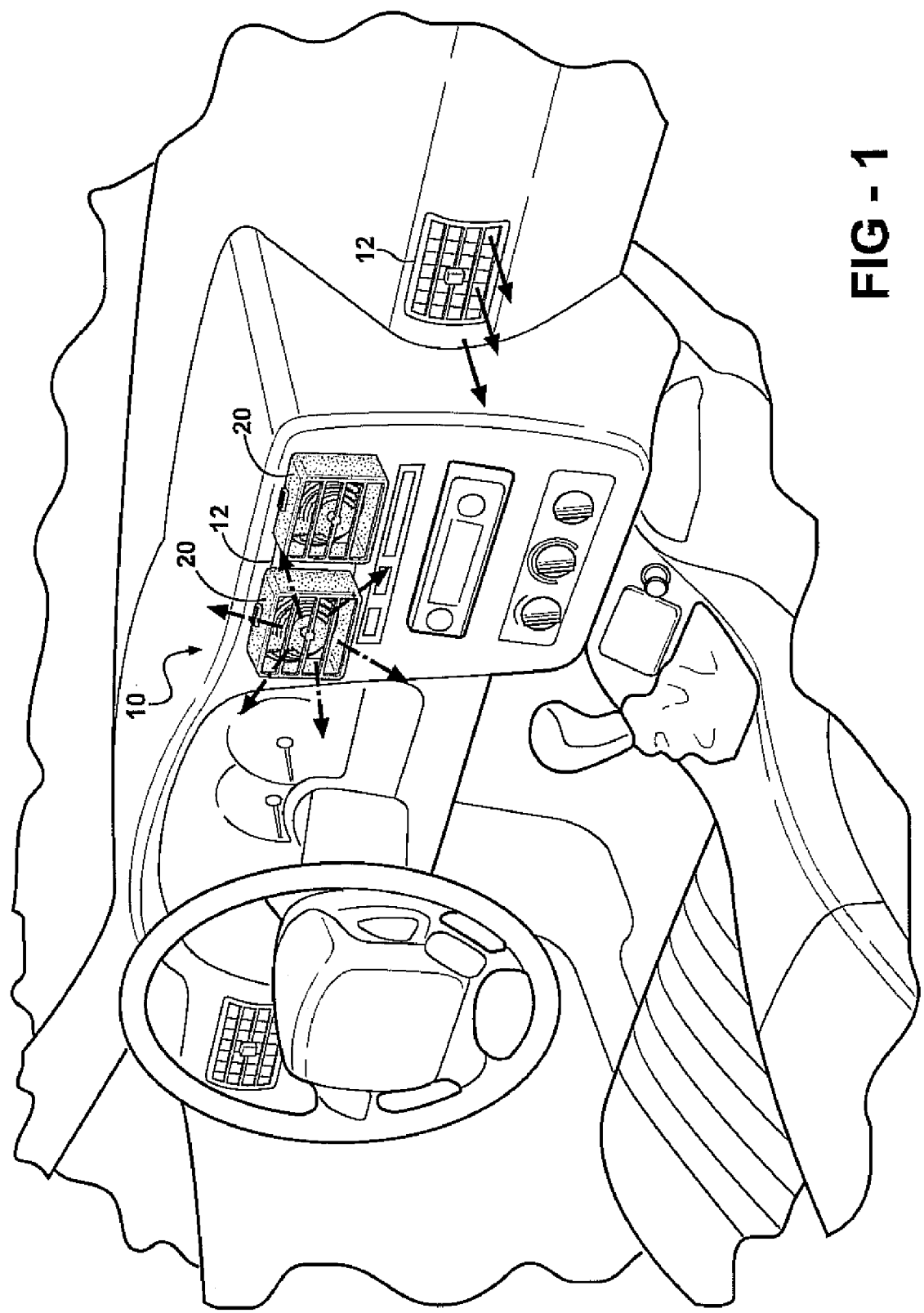
FIG. 1 is a perspective view of a dashboard of an automotive vehicle showing an oscillator device according to the invention coupled to an air vent.

Referring to FIG. 1, a dashboard in a passenger compartment of an automotive vehicle is generally indicated at 10. The dashboard 10 includes an air vent 12 that delivers air from a ventilation system of the vehicle. Described in detail below, the invention provides an oscillating device 20 that distributes the air passing through the air vents 12 in an oscillating manner into the passenger compartment.

Figure 2:
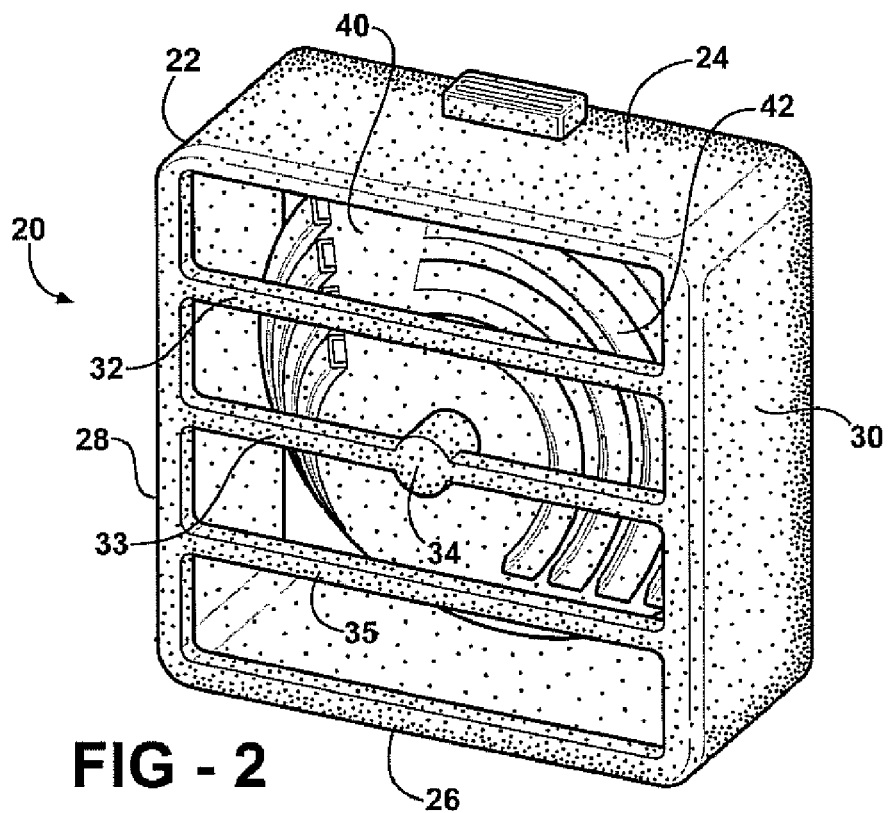
FIG. 2 is a front perspective view of the oscillator device.
Figure 3:
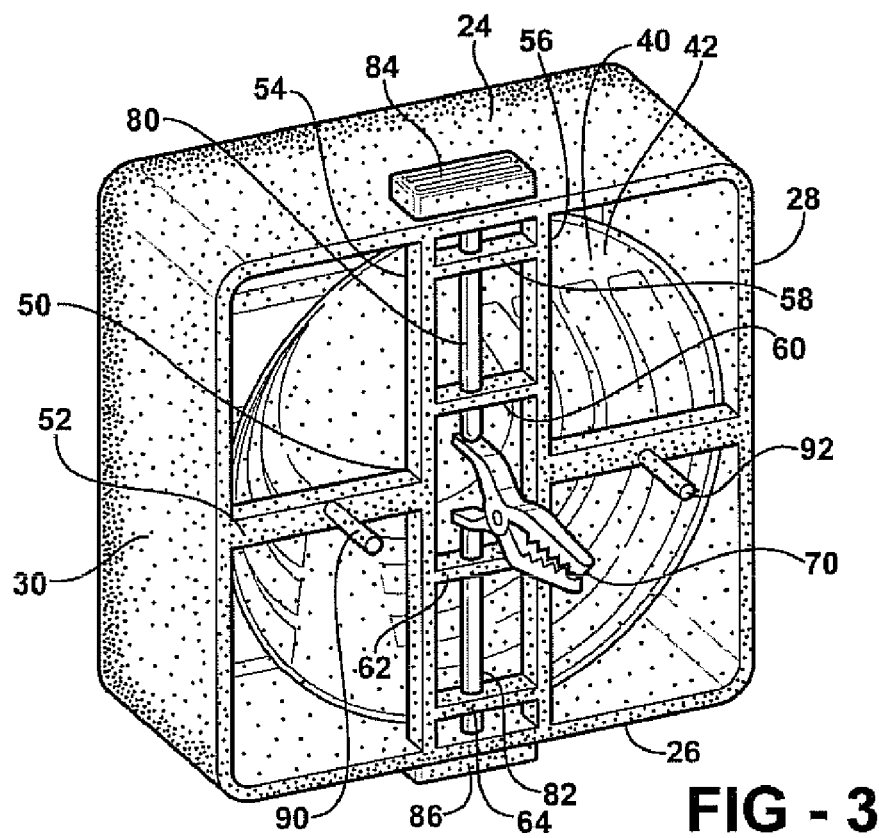
FIG. 3 is a rear perspective view of the oscillator device.
Figure 4:
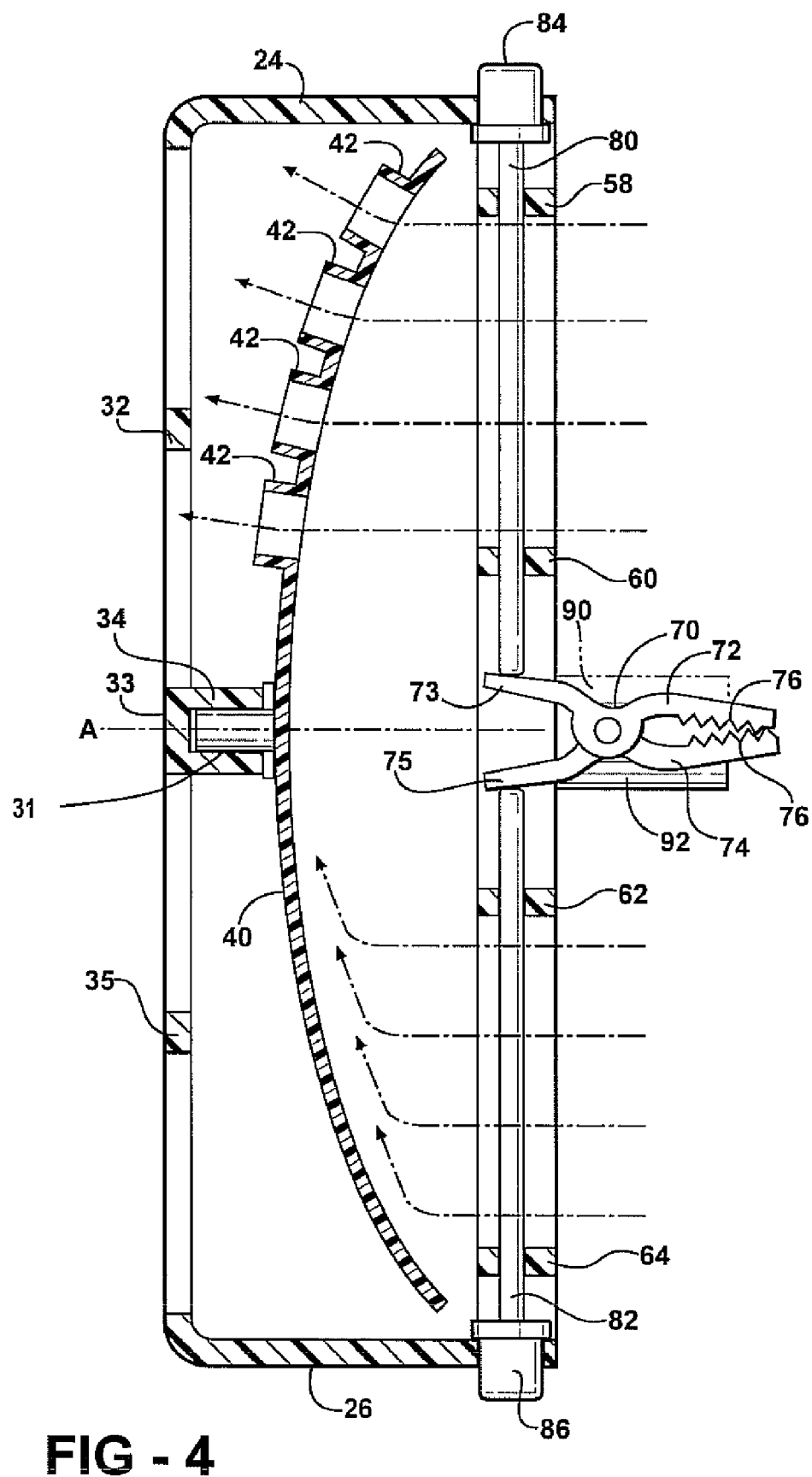
FIG. 4 is a cross sectional view of the oscillator device.

Referring to FIGS. 2-4, the oscillating device 20 includes a box-shaped housing 22 having a top wall 24, a bottom wall 26 and a pair of side walls 28, 30. A front side of the housing 22 (FIG. 2) includes plurality of slats 32, 33, 35 extending between the side walls 28, 30. One of the slats 33 includes a boss 34 extending inwardly toward the back side of the housing 22.

A fan element 40 is pivotally coupled to the boss 34 for rotation about a fixed fan pivot axis A. The fan element 40 is generally convex shaped as viewed from the front of the housing 22. The fan element 40 includes a plurality of troughs or channels 42. The channels 42 each have an axis that extends along a direction not parallel to the fan pivot axis A. The channels 42 extend radially outwardly from the fan pivot axis A, so that air passing through the channels 42 is distributed radially outwardly from the front of the housing 22 as the fan element 40 rotates. In one embodiment, as best shown in FIG. 4, the angle between the axis of each channel and the fan pivot axis A is directly proportional to the distance between each channel and the fan pivot axis A. The channels 42 are also angled in a rotational direction, so that air passing through the channels 42 causes rotation of the fan element A about the fan pivot axis A. The channels 42 are shown arranged in a radially extending row, though it should be readily appreciated by those skilled in the art that the channels may be positioned along the fan element 40 in other ways. For example, the channels may be positioned along a nonradial linear path or along an arcuate path along the fan element.

Optionally, a damper 31 may be used to provide friction between the fan element 40 and the boss 34 to passively control the rotational speed of the fan element 40. The damper may be viscous, elastomeric, or other suitable materials known by those skilled in the art.

Optionally, the oscillating device may also include a stop mechanism that allows selective locking of the fan element relative to the housing, so that air is directed by the channels to a fixed location. For example, a set screw may be threaded through a bore formed in the boss or the walls of the housing to interfere with the rotation of the fan element relative to the housing. Other examples of a stop mechanism may include a swing arm pivotally coupled to the housing or a pin slidably coupled to the housing, either of which may be movable to a locking position to interfere with the rotation of the fan element relative to the housing.

As shown in FIG. 3, the back side of the housing 22 includes a lattice-type support frame 50 extending between the top wall 24, bottom wall 26 and side walls 28, 30. More specifically, the support frame 50 includes a cross member 52 that extends between the side walls 28, 30. The support frame 50 also includes a pair of generally parallel and spaced apart beams 54, 56 that is generally orthogonal relative to the cross member 52. A plurality of middle walls 58, 60, 62, 64 extends generally orthogonally between the beams 54, 56.

Referring to FIGS. 2-4, a clip mechanism 70 is supported by the frame 50 and allows the oscillating device 20 to be coupled to The vent. The clip mechanism 70 includes arms 72, 74 pivotally coupled to each other. The outer end of at least one of the arms 72, 74 includes teeth 76 for gripping a side of one of the rungs of the vent. In the embodiment shown in the figures, both arms 72, 74 include teeth 76 along the outer ends. Inner ends 73, 75 of the arms 72, 74 are coupled to respective rods 80, 82. The rods 80, 82 extend through holes in the middle walls 58, 60, 62, 64 and are slidably coupled to the middle walls 58, 60, 62, 64. The rods 80, 82 extend through respective top 24 and bottom 26 walls and terminate at buttons 84, 86. Pressing the buttons 84, 86 toward each other causes the outer ends of the arms 72, 74 to separate for receiving a portion of the vent therebetween. Preferably, the arms 72, 74 are biased by a spring or other suitable biasing member (not shown) toward a closed position so that the teeth 76 continue to grasp the vent after the buttons 84, 86 are released.

Locating pins 90, 92 extend outwardly from the cross member 52 and extend between an adjacent pair of rungs to help position the oscillating device 20 relative to the vent. As best shown in FIG. 4, the pins 90, 92 are spaced apart along a direction orthogonal to the rungs of the vent, so as to engage opposite sides of one of the rungs during installation of the oscillating device 20 to the vent.

In use, the buttons 84, 86 are pressed inwardly toward each other to separate the outer ends of the arms 72, 74. A rung from the vent is inserted between the outer ends of the arms 72, 74. The buttons 84, 86 are released to allow the teeth 76 to clamp opposite sides of the rung, thereby securing the oscillating device 20 to the vent.

Forced air exits the vents 12 and passes through the housing 22 of the oscillating device 20. Some of the air passing through the housing 22 is redirected through the channels 42, which creates a rotational force that causes the fan element 40 to rotate about the fan pivot axis A. As the fan elements 40 rotates about the pivot axis A, air is distributed radially and outwardly from the front of the housing 22.

Figure 5:
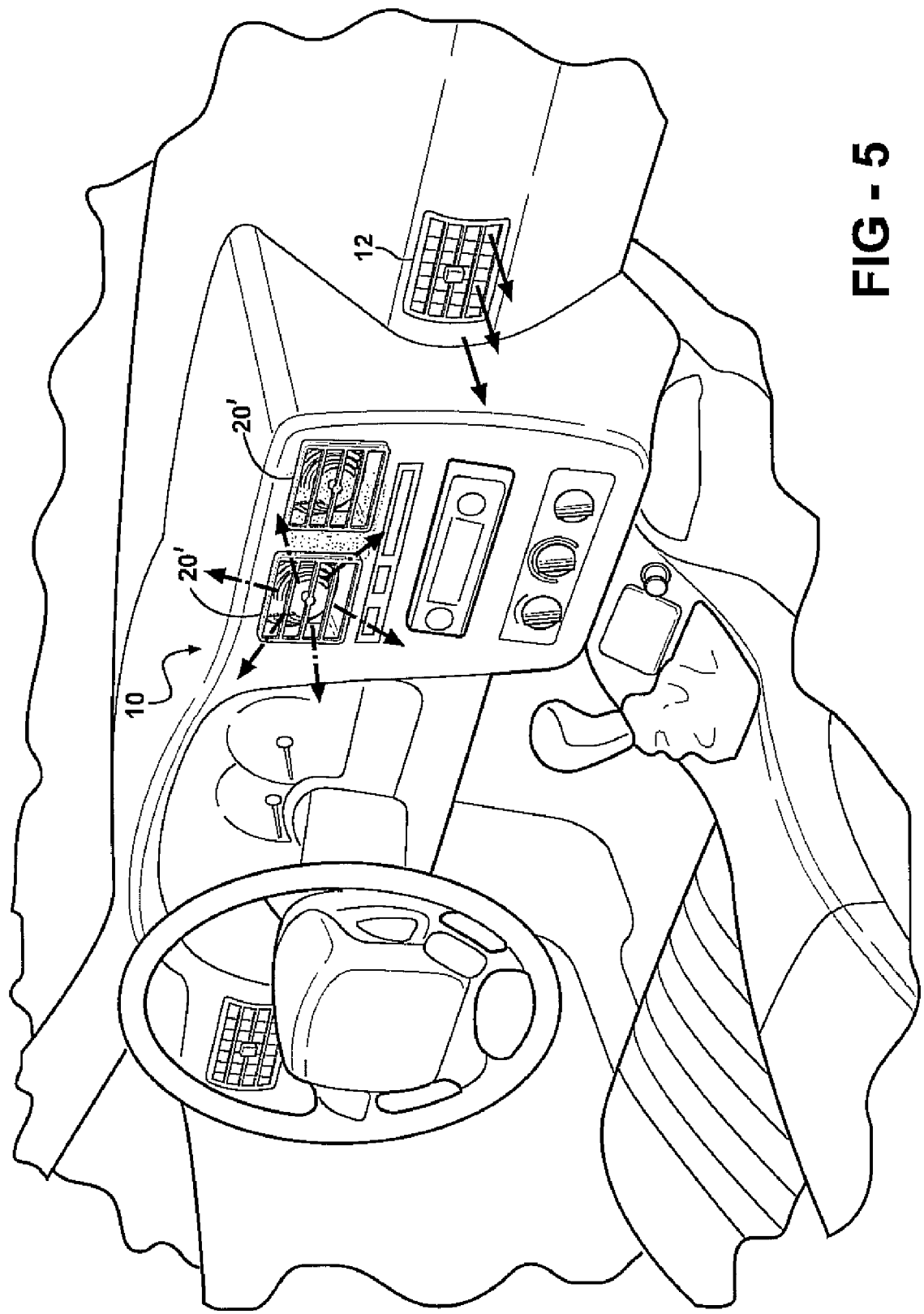
FIG. 5 is a perspective view of the dashboard showing the oscillator device according to a second embodiment of the invention.

Referring to FIG. 5, a second embodiment of the oscillating device 20' is shown. In this embodiment, the oscillating device 20' is generally integrated with the dashboard 10', wherein a front end of the housing is generally flush with an outer surface of the dashboard or otherwise disposed behind the vent in the dashboard.

The invention has been described in an illustrative manner. It is, therefore, to be understood that the terminology used is intended to be in the nature of words of description rather than of limitation. Many modifications and variations of the invention are possible in light of the above teachings. For example, the fan element may be actively driven or controlled by an actuator, such as an electric motor. The fan element may also be rotatably driven in a reciprocating manner between opposite directions, so as to distribute air from side to side in the passenger compartment. As another example, the oscillating device may be coupled with any vent located within the vehicle, such as in a rear side panel, a center console and the like. Thus, within the scope of the appended claims, the invention may be practiced other than as specifically described.

I claim:

1. An air distribution device for directing air exiting a vent in an interior of a vehicle, said air distribution comprising:
   a housing;
   a domed shaped fan element rotatably attached to said housing for rotation therein about a fixed fan pivot axis, said fan element having a first surface facing the vent and an opposite second surface facing the interior of the vehicle; and
   at least one generally U-shaped trough formed in said fan element, said at least one trough curving at least partially circumferentially relative to said pivot axis, said at least one trough having a first end and a second end, said first end receiving air from the vent and directing the air to an opening formed at said second end so as to exit out said second surface.

2. The air distribution device of claim 1, further comprising:
   a clip mechanism extending along a back side of said housing for fixedly securing said housing to the vent, said clip mechanism being actuatable by a pair of arms; and
   a pair of buttons each slidably coupled to respective apertures in opposite sides of said housing, each button being in mechanical communication with one of said pair of arms, so as to allow actuation of said clip mechanism as said buttons are displaced inwardly toward said housing.

3. The air distribution device as set forth in claim 2, wherein the arms of the clip mechanism are pivotally coupled to each other, each arm having opposite inner and outer ends.

4. The air distribution device as set forth in claim 3, wherein the outer end of at least one of the arms includes teeth for gripping a rung of the vent.

5. The air distribution device as set forth in claim 3 including a biasing member for biasing the outer ends of the arms toward each other.

6. The air distribution device as set forth in claim 3 including a pair of rods each extending between one of the buttons and an inner end of one of the respective arms, so as to cause actuation of the clip mechanism in response to displacement of the buttons toward each other.

7. The air distribution device as set forth in claim 6, wherein each rod is slidably coupled to a support frame disposed along a back end of the housing.

8. The air distribution device as set forth in claim 7, wherein the support frame includes a pair of beams extending between the opposite sides of the housing, the beams being generally parallel with the rods.

9. The air distribution device as set forth in claim 8, wherein the support frame includes a plurality of middle walls extending between the beams.

10. The air distribution device as set forth in claim 9, wherein the rods are slidably coupled to the middle walls.

11. The air distribution device as set forth in claim 10, wherein the support frame includes a cross member that extends orthogonally relative to the beams.

12. The air distribution device as set forth in claim 11, including a pair of locating pins extending outwardly from the cross member to facilitate location of the housing relative to the vent.

13. The air distribution device as set forth in claim 12, wherein the pins are spaced apart to locate opposite sides of a rung of the vent.

14. The air distribution device of claim 1, wherein said fan element includes a plurality of troughs extending at least partially circumferentially relative to said pivot axis in radially extending rows.

15. The air distribution device as set forth in claim 14, wherein an angle between the fan pivot axis and the axis of each trough being directly proportional to the distance between each trough and the fan pivot axis.

16. The air distribution device of claim 1, wherein said at least one trough increases in depth moving from said first end to said second end.

17. The air distribution device as set forth in claim 1, wherein the fan element is convex relative to the front end of the housing.

18. The air distribution device as set forth in claim 1, wherein the fan element is pivotally coupled to a boss integrally formed with the housing.

19. The air distribution device as set forth in claim 1 including a damper for dampening rotation of the fan element relative to the housing.

20. The air distribution device as set forth in claim 1, wherein the front end of the housing substantially flush with an outer surface of the interior panel.

* * * * *

UNITED STATES PATENT AND TRADEMARK OFFICE
CERTIFICATE OF CORRECTION

| | | |
|---|---|---|
| PATENT NO. | : 7,871,318 B2 | Page 1 of 1 |
| APPLICATION NO. | : 11/567277 | |
| DATED | : January 18, 2011 | |
| INVENTOR(S) | : Paxton S. Williams | |

It is certified that error appears in the above-identified patent and that said Letters Patent is hereby corrected as shown below:

Column 1 line 32 replace "fie" with --the--

Signed and Sealed this
Ninth Day of August, 2011

David J. Kappos
*Director of the United States Patent and Trademark Office*